United States Patent
Kennedy

(10) Patent No.: US 7,054,621 B2
(45) Date of Patent: May 30, 2006

(54) METHOD, DEVICE AND SYSTEM FOR ESTABLISHING COMMUNICATIONS WITH MULTIPLE COMMUNICATION DEVICES

(75) Inventor: Peter J. Kennedy, Durham, NC (US)

(73) Assignee: Sony Ericsson Mobile Communications AB (SE)

(*) Notice: Subject to any disclaimer, the term of this patent is extended or adjusted under 35 U.S.C. 154(b) by 469 days.

(21) Appl. No.: 10/065,686

(22) Filed: Nov. 8, 2002

(65) Prior Publication Data

US 2004/0203977 A1 Oct. 14, 2004

(51) Int. Cl.
*H04Q 7/20* (2006.01)
(52) U.S. Cl. ............... 455/416; 455/414.1; 379/202.01
(58) Field of Classification Search .. 455/414.1–414.4, 455/422.1, 518, 519, 416; 379/205.1, 202.01–202.04, 379/206.01, 158; 370/261, 262
See application file for complete search history.

(56) References Cited

U.S. PATENT DOCUMENTS

| | | | |
|---|---|---|---|
| 5,559,876 A | | 9/1996 | Alperovich |
| 6,088,435 A | * | 7/2000 | Barber et al. .......... 379/205.01 |
| 6,175,741 B1 | | 1/2001 | Alperovich |
| 6,236,854 B1 | * | 5/2001 | Bradshaw, Jr. .............. 455/416 |
| 6,295,447 B1 | | 9/2001 | Reichelt et al. |
| 2002/0009990 A1 | * | 1/2002 | Kleier et al. ................ 455/416 |

FOREIGN PATENT DOCUMENTS

| | | |
|---|---|---|
| DE | 44 27 832 A1 | 2/1996 |
| GB | 2 327 571 | 1/1999 |
| WO | WO 01/63949 A1 | 8/2001 |

OTHER PUBLICATIONS

PCT International Search Report, PCT/US03/31701, Nov. 24, 2004.

* cited by examiner

*Primary Examiner*—Matthew D. Anderson
*Assistant Examiner*—Philip J Sobutka
(74) *Attorney, Agent, or Firm*—Charles L. Moore; Moore & Van Allen, PLLC

(57) ABSTRACT

A method, device and system for establishing communications with multiple communication devices are disclosed. The method includes selecting a multiparty call group from a storage device or forming a multiparty call group. The multiparty call group may include contact information for each communication device in the multiparty call group. The method may also includes establishing communications with each communication device in the multiparty call group.

69 Claims, 8 Drawing Sheets

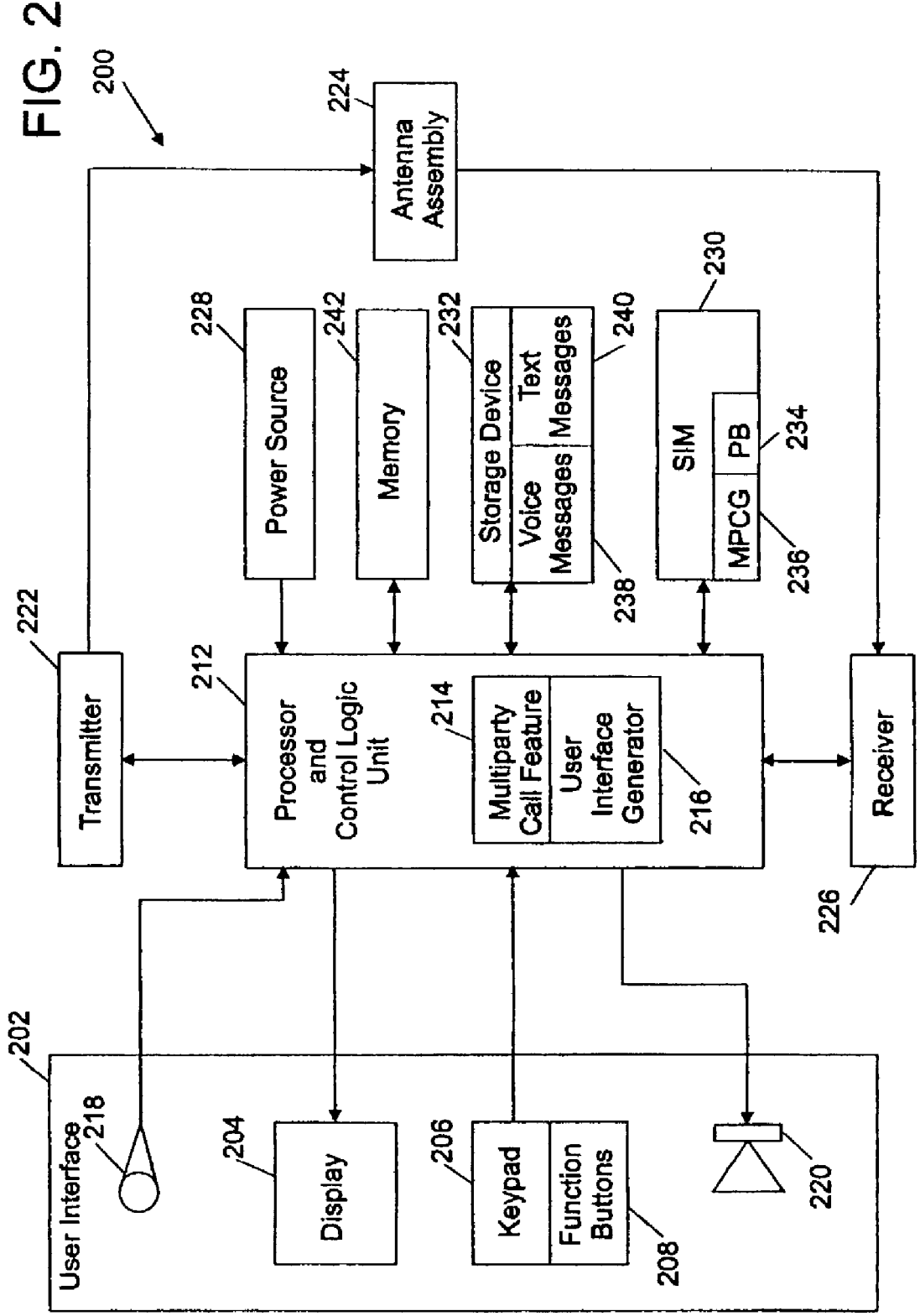

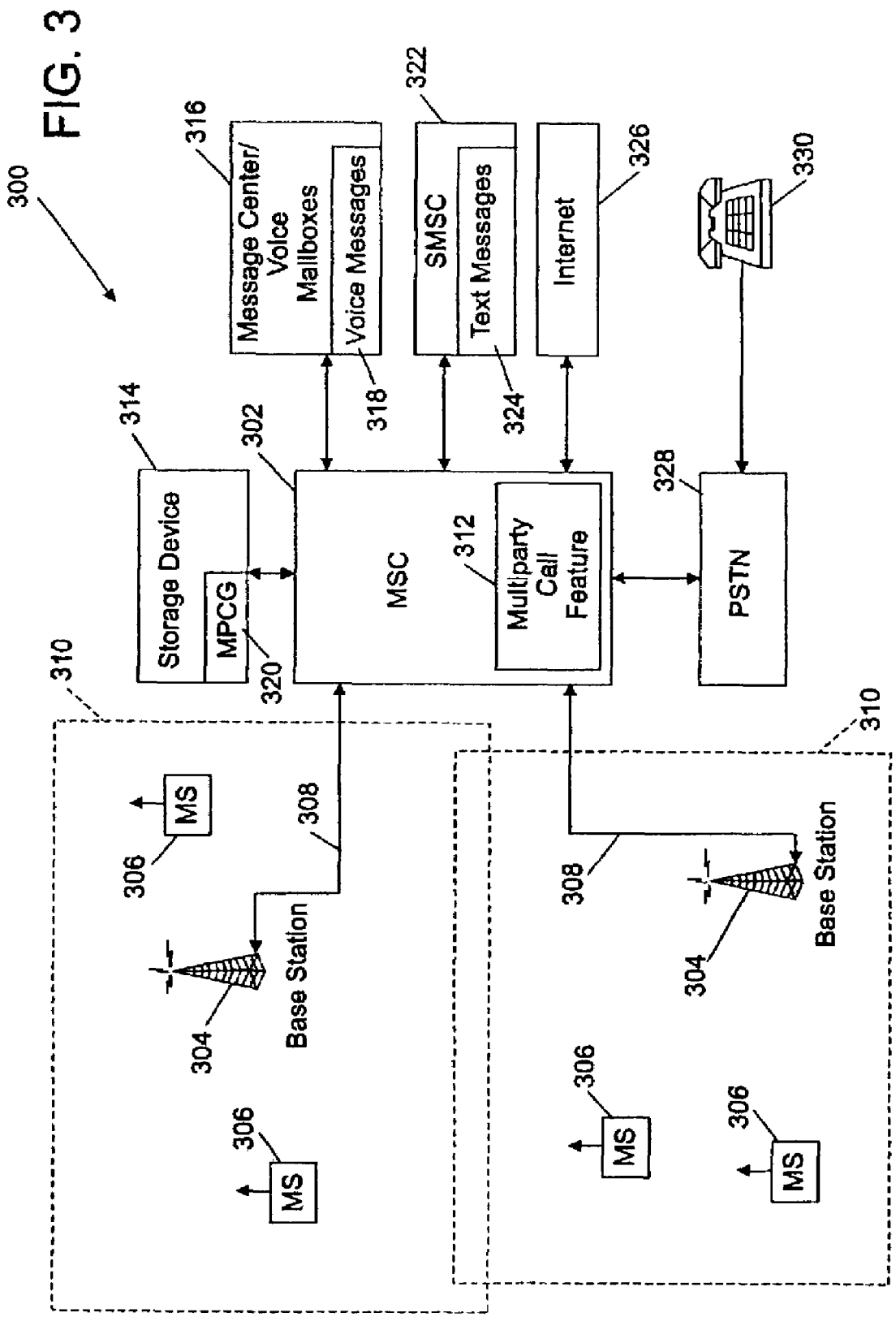

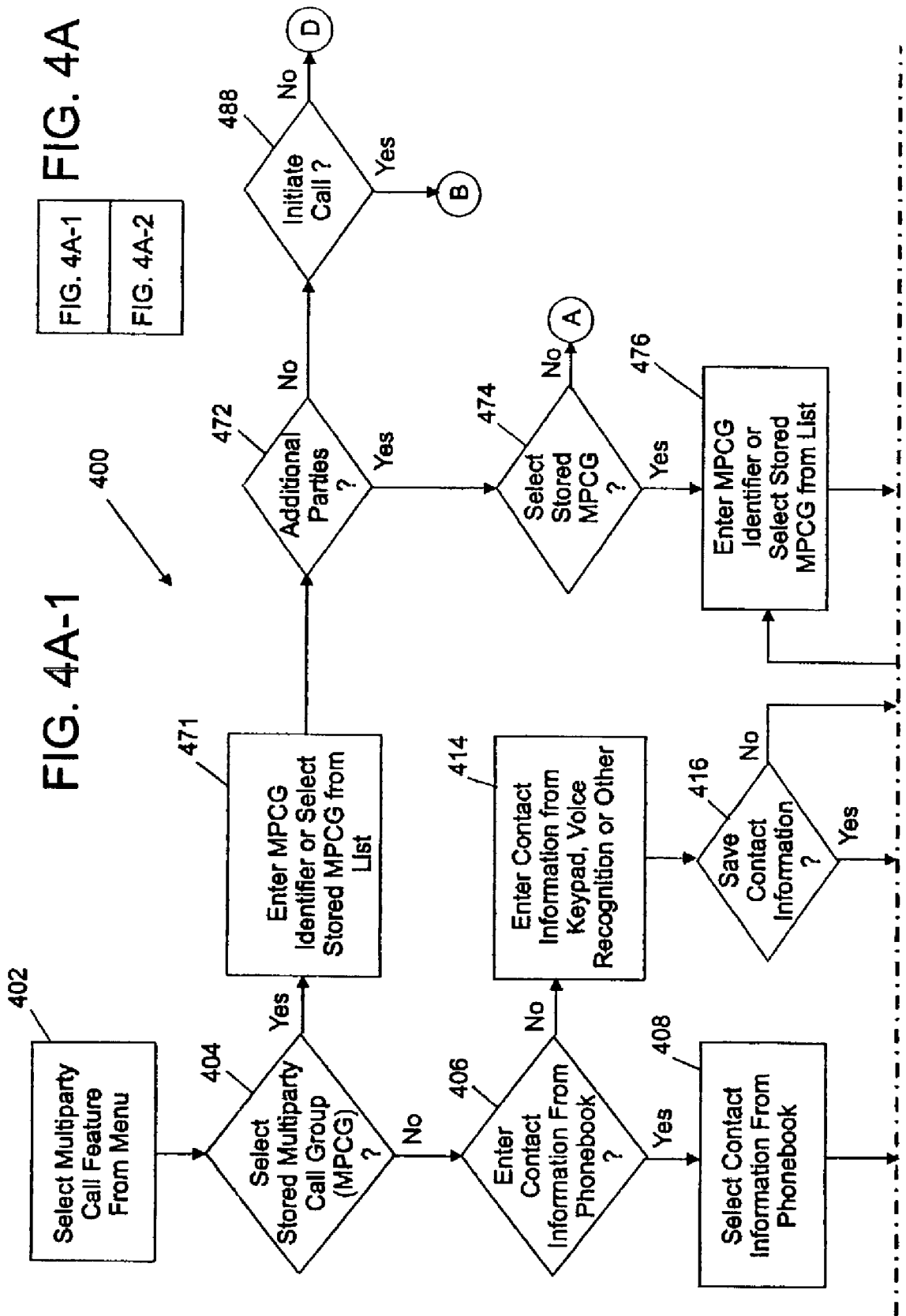

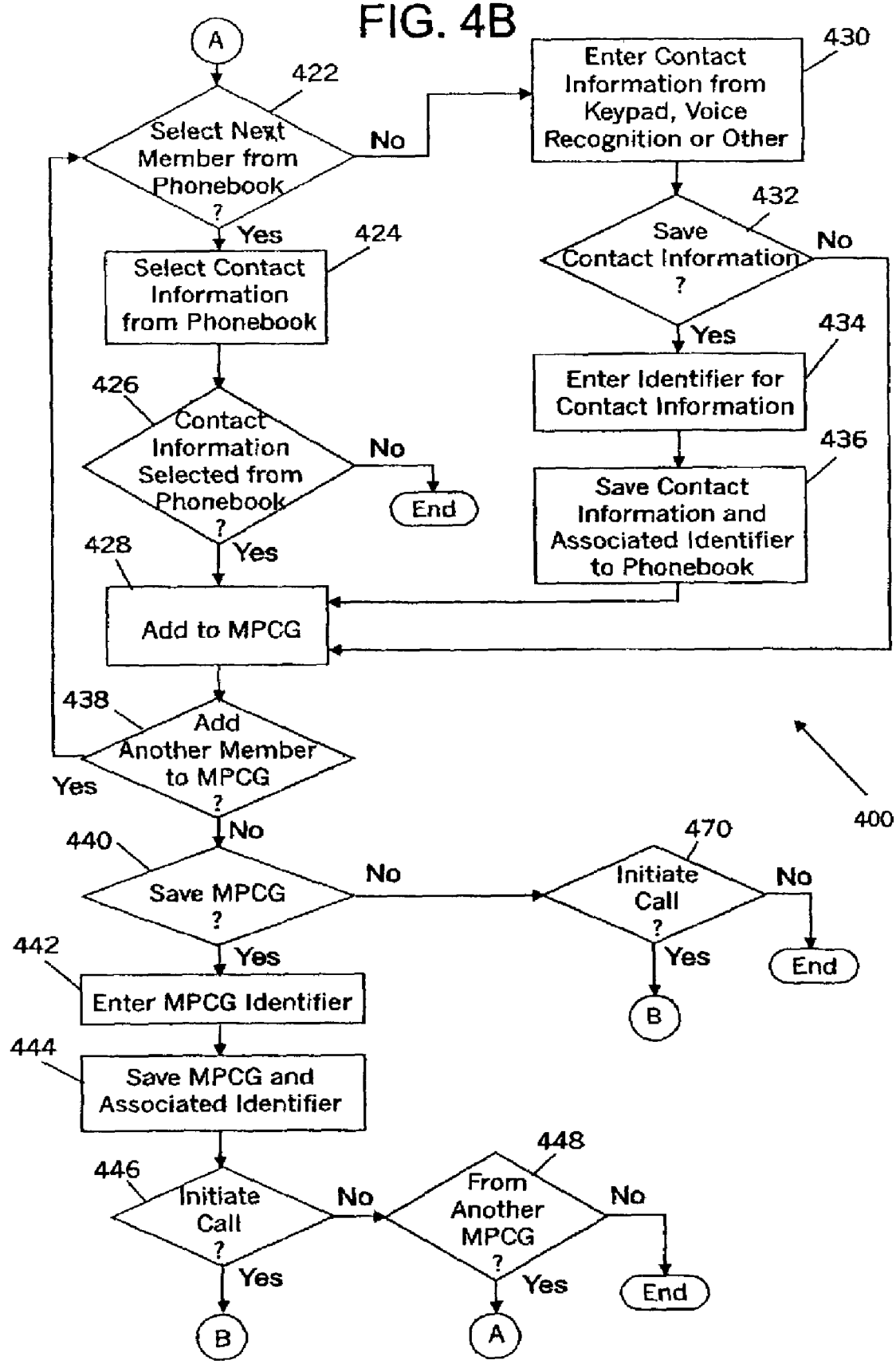

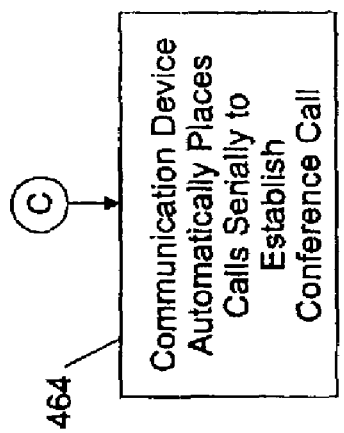
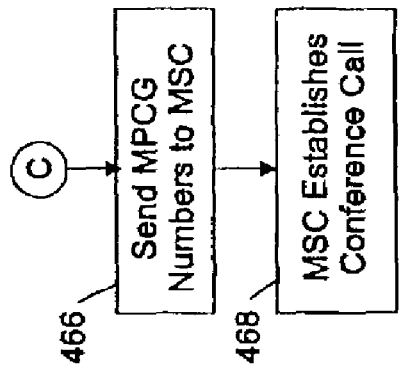
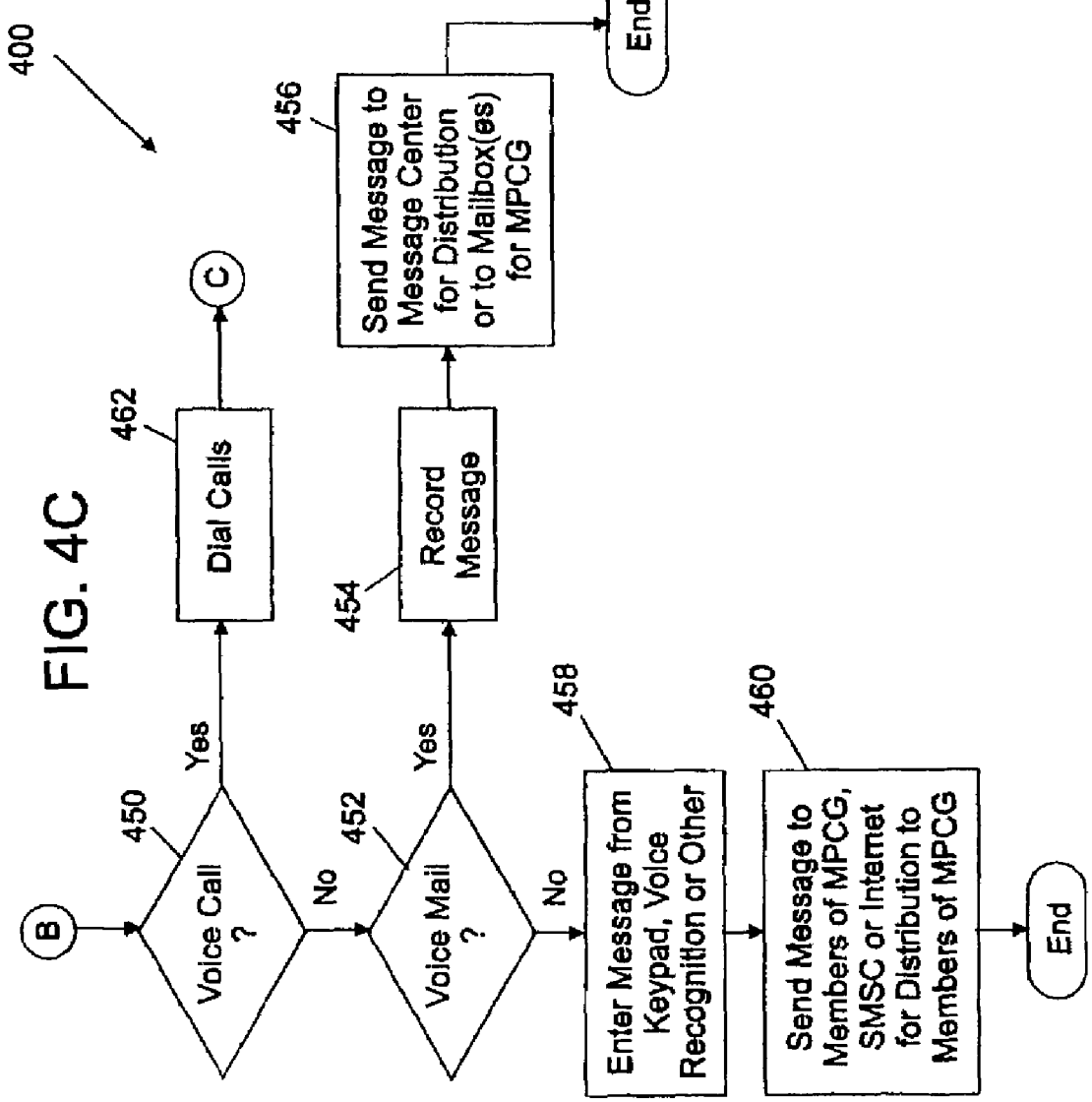

METHOD, DEVICE AND SYSTEM FOR ESTABLISHING COMMUNICATIONS WITH MULTIPLE COMMUNICATION DEVICES

BACKGROUND OF INVENTION

Field of the Invention

The present invention relates to communication devices, systems, and the like and more particularly to a method, device and system for establishing communications with multiple communication devices.

Making a multiparty or conference call with a communication device, such as a mobile phone, cellular phone or the like, can be tedious and very time consuming. Currently, a separate call must be established with each member of the conference call. Accordingly, the user must serially dial the phone number or separately select the phone number from a memory location or phonebook portion of the mobile phone for each member of the conference call. Communication must be established by the user with each new member before proceeding to add a subsequent member to the conference call. As each new number is dialed and added to the conference call, the user must place the previously added members on hold to add the next member or party. Additionally, each time the user wants to establish a conference or multiparty call or communication with the same members, the user must again go through the entire process of adding each member individually.

Similarly, if a communication device or mobile phone user desires to communicate a voice message or a text message to multiple other communication devices, the user must dial each voice or text mailbox separately and serially transmit the voice or text message to each communication device. Again, the user must go through this lengthy process of dialing each number every time the user desires to send a voice or text message to the same group of communication devices.

Accordingly, there is a need to provide a method to establish communications with multiple communication devices or a multiparty call group that permits all phone numbers or contact information to be entered before establishing a conference call or sending a voice message or text message to the multiple communication devices. Additionally, there is a need to provide a method that permits the phone numbers or contact information for each of the communication devices in a multiparty call group to be saved for subsequent conference calls or communications with the same multiparty call group. Additionally, there is a need to provide a communication device and system that permits all phone numbers or other contact information to be entered before establishing a conference call or sending a voice or text message to multiple communication devices of a multiparty call group and that permits the phone numbers or other contact information for each member of a multiparty call group to be saved for subsequent communication with the same multiparty call group.

SUMMARY OF INVENTION

In accordance with an embodiment of the present invention, a method for establishing communications with multiple communication devices may include selecting a multiparty call group from a storage device or forming a multiparty call group. The multiparty call group may include contact information for each communication device in the multiparty call group. Communications may then be established with each communication device in the multiparty call group.

In accordance with another embodiment of the present invention, a method for establishing communications with multiple communication devices may include providing a multiparty call feature for selection by a user. An option may be presented to the user to select any stored multiparty call group or to form a multiparty call group in response to the user selecting the multiparty call feature. In one embodiment, the user may be permitted to form a multiparty call group by selecting contact information from a storage device or by entering contact information into a communication device.

In accordance with another embodiment of the present invention, a device for establishing communications with multiple communication devices may include a multiparty call feature. A display may be included to present the multiparty call feature to a user for selection, and a storage device may be included to store any multiparty call groups for selection by the user. The device may also include a transmitter to communicate with members of a multiparty call group.

In accordance with another embodiment of the present invention, a system for establishing communications with multiple communication devices may include at least one base station to communicate with at least one communication device and a mobile switching center to communicate with the at least one base station. A multiparty call feature may be included to permit a user of the at least one communication device to communicate with multiple other communication devices by selecting the multiparty call feature.

In accordance with another embodiment of the present invention, a computer-readable medium having computer-executable instructions may be provided for performing a method that may include providing a multiparty call feature for selection by a user. An option may be presented to the user to select any stored multiparty call group or to form a multiparty call group in response to the user selecting the multiparty call feature.

BRIEF DESCRIPTION OF DRAWINGS

FIG. 2 is a block diagram representative of the internal components of an exemplary communication device in accordance with the present invention.

FIG. 3 is a block diagram of an exemplary communication system in accordance with an embodiment of the present invention.

FIGS. 4A, 4B, 4C, 4D, 4E and 4F are a flow chart of a method for establishing communication between multiple communication devices in accordance with an embodiment of the present invention.

DETAILED DESCRIPTION

Figure 1:
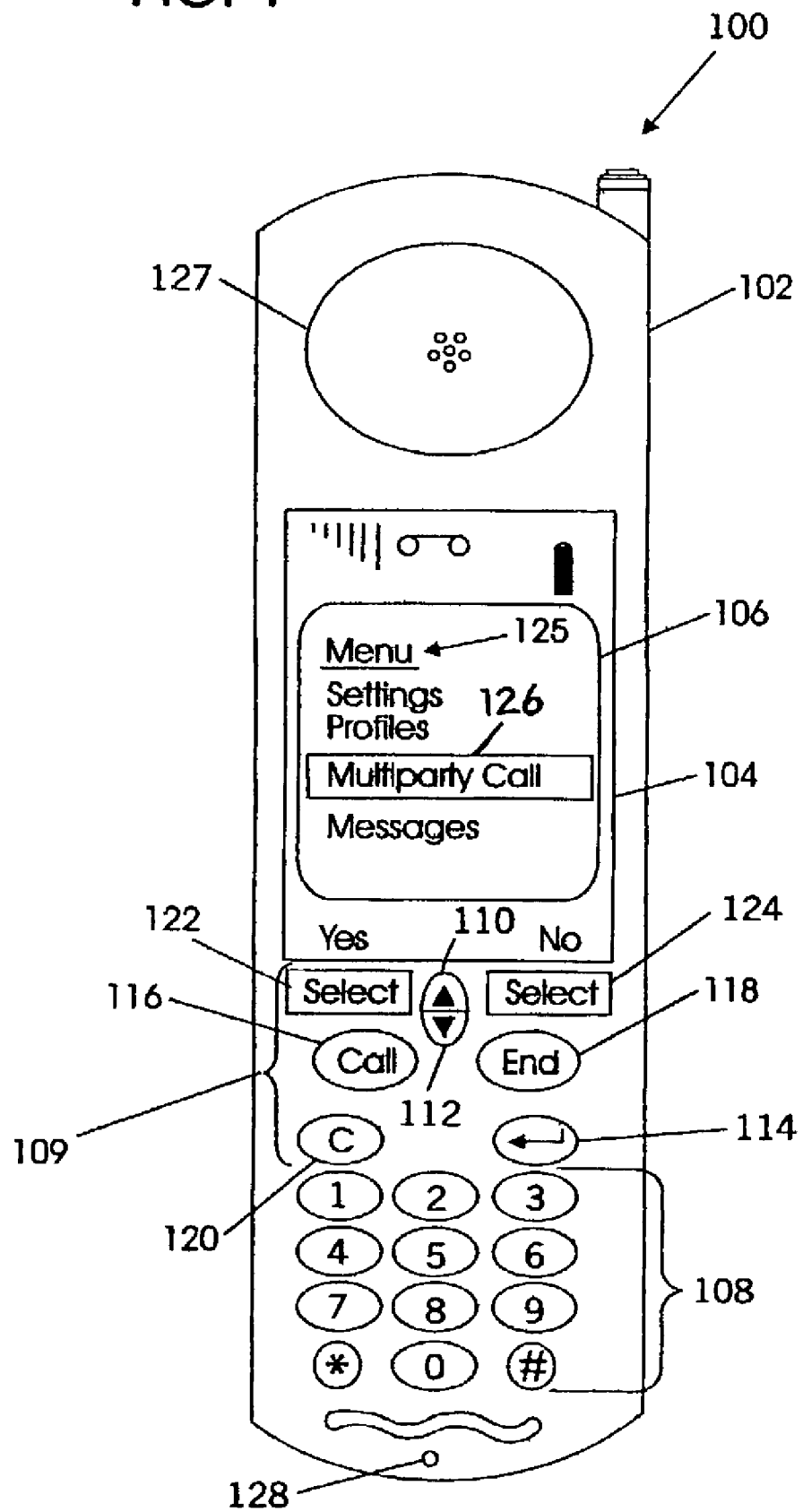
FIG. 1 is an illustration of an example of a communication device in accordance with the present invention.

FIG. 1 is an illustration of an example of a communication device 100 in accordance with an embodiment of the present invention. The communication device 100 may include a housing 102. A display 104 may be inserted in an opening in the housing 102 to provide information to a user or operator in the form of text, numerals, characters, or a Graphical User Interface (GUI) 106 or the like. The display 104 may be a liquid crystal display (LCD), light emitting diode (LED) panel or the like. A GUI 106 may be a program interface that may include pictures as well as words, numerals, or other characters on the display screen 104 to provide information to the user or operator. This type of interface takes advantage of a display's graphical capabilities to make programming and use of the communication device 100 easier. The GUI 106 may be used to program or enter information into the communication device 100 including identifiers, such as phone numbers, names, e-mail addresses, or the like. The present invention, however, is not limited to any one particular method or means of entering information.

The communication device 100 may also include an alphanumeric keypad 108 and function buttons 109 to facilitate entering phone numbers and commands to control operation of the communication device 100. The function buttons 109 may include a scroll-up button 110 and a scroll-down button 112, an enter/YES button 114, a talk/call button 116, an end button 118, a clear (C) button 120, and select buttons 122 and 124. The select buttons 122 and 124 may be used to select alternatives that may appear above the buttons 122 and 124 in the display 104 or GUI 106 or to move between different menus. The scroll-up button 110 and the scroll-down button 112 may facilitate navigating through different menus that may be displayed on the display 104 or GUI 106. The enter/YES button 114 or select buttons 122 and 124 may be used to select different items in a displayed menu to control operation of the communication device 100. The talk/call button 116 may be used to answer an incoming call or to initiate an outgoing call after a phone number is entered using the keypad 108. The end button 118 may be used to discontinue an operation of the communication device 100, such as a phone call or the like. The clear button 120 may be used to clear an entry entered from the keypad 108 or to abort or discontinue an operation being performed by the communication device 100.

The function buttons 109 shown in FIG. 1 are merely examples of different types of names and functions of such buttons and may differ from one industrial design to another. In some phones, functions may be combined in a single button. For example, soft keys may be displayed in the GUI 106 and used to implement some of the functions of buttons 109. Accordingly, the present invention is not intended to be limited by the specific function buttons 109 shown in FIG. 1.

The display 104 or GUI 106 may be used to present a menu 125, options or the like to a user to select between different options or functions to be performed by the communication device 100. For example, the menu 125 may include a multiparty call feature 126 as an option for selection by the user in accordance with the present invention. The user may use the scroll buttons 110 and 112 to scroll between the menu items and highlight or otherwise mark for selection the different menu items, such as the multiparty call feature 126. The marked or highlighted menu item may then be selected by the user operating the enter/YES button 114 or one of the select buttons 122 or 124.

The housing 102 may also include a speaker grill 127 and a microphone grill 128. A speaker (not shown in FIG. 1) may be positioned within the housing 102 behind the speaker grill 127 and a microphone (also not shown in FIG. 1) may be positioned behind the microphone grill 128 within the housing 102. The method for establishing communication between multiple devices or multidialer method of the present invention may be activated or enabled by voice activation using the microphone 128.

FIG. 1 illustrates an example of a typical layout of a communication device 100, such as a mobile terminal or the like. However, the present invention is not limited to any particular type communication device, design or layout.

Figures 2, 4A:
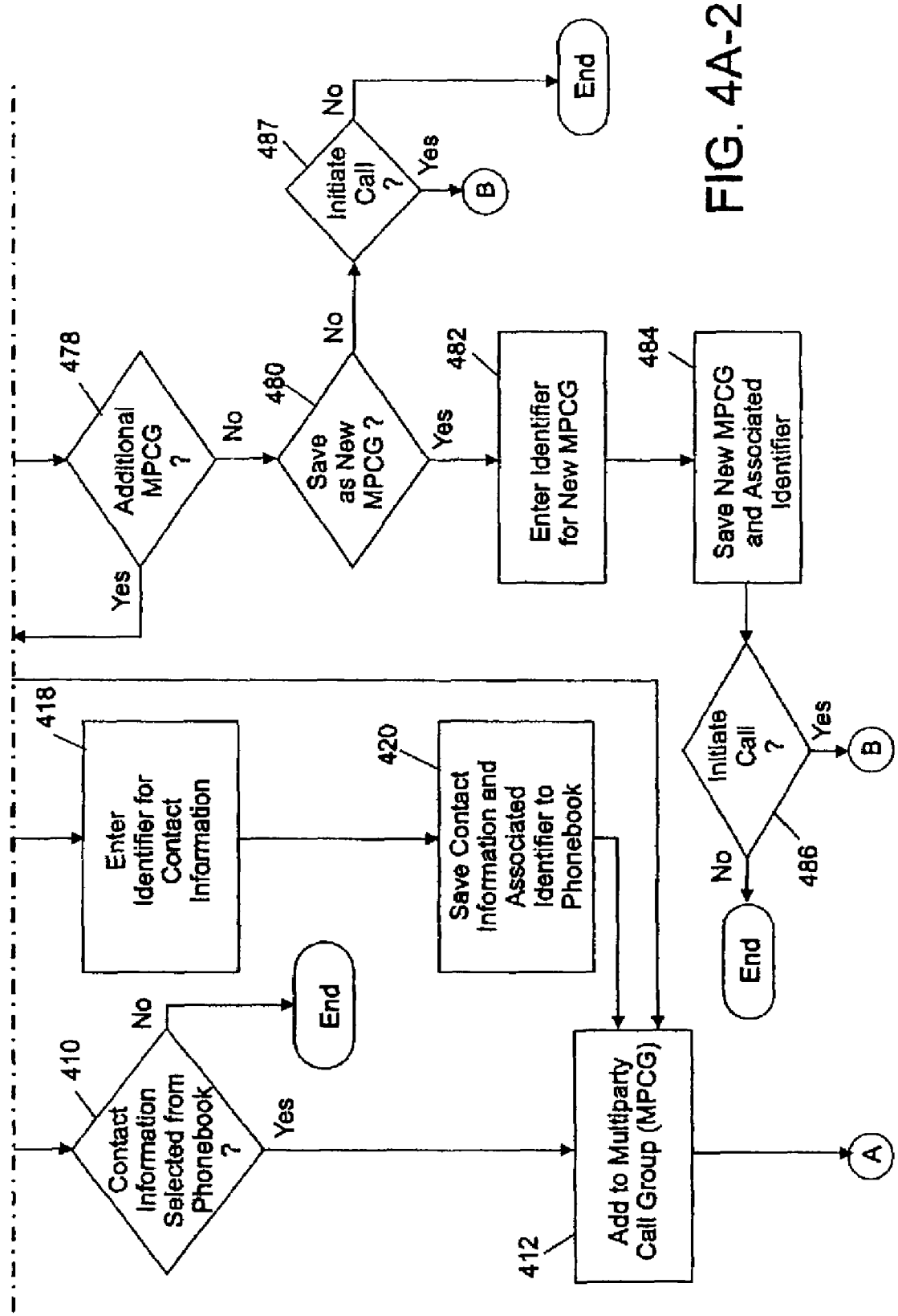

FIG. 2 is a block diagram representative of the internal components of a typical communication device 200 that may be the same as the communication device 100 of FIG. 1. The communication device 200 may be a cordless telephone, cellular telephone, personal digital assistant (PDA), communicator, computer device or the like and is not unique to any particular communication standard, such as Advanced Mobile Phone Service (AMPS), Digit Advanced Mobile Phone Service (D-AMPS), Global System for Mobile Communications (GSM), Code Division Multiple Access (CDMA) or the like. The layout shown in FIG. 2 is for purposes of explaining the present invention and the present invention is not limited to any particular design. The communication device 200 may include an operator or user interface 202 to facilitate controlling operation of the communication device 200 including initiating and conducting phone calls, entering information and the like. The user interface 202 may include a display 204, similar to the display 104 of FIG. 1, to provide visual signals to the subscriber or user as to the status and operation of the communication device 200. The user interface 202 may also include a keypad 206 and function buttons 208, similar to the keypad 108 and function buttons 109 of FIG. 1. The keypad 206 and function buttons 208 permit the user to program the communication device 200, enter data or messages and to communicate commands to the communication device 200 to dial phone numbers, initiate and terminate calls and to control operation of the communication device 200. In this regard, the keypad 206 and function buttons 208 may be used to form or program multiparty call groups into the communication device 200 and to establish multiparty calls or communication with multiple parties via voice communication, recorded voice messages, text messages and the like in accordance with the present invention.

The display 204, keypad 206 and function buttons 208 may be coupled to a main processor and logic unit 212. The main processor and logic unit 212 may be a microprocessor or similar type device. The main processor and logic unit 212 encodes and decodes control signals, performs call processing procedures and controls operation of the communication device 200. The main processor and logic unit 212 may include or may be programmed to perform a multiparty call feature 214 in accordance with the present invention. The multiparty call feature 214 may be a software program, computer executable instructions or the like for carrying out multiparty calls or communications in accordance with the present invention as will be described in more detail below. The processor and control logic unit 212 may also include a user interface generator 216 to generate screens or GUIs, similar to GUI 106 of FIG. 1. The multiparty call feature 214 or user interface generator 216 in conjunction with the multiparty call feature 214 may be used to present requests or prompts to the user for information to facilitate forming or creating multiparty call groups, performing multiparty calls or communications and similar operations in accordance with the present invention as will be described in more detail below. The multiparty call feature 214 or user interface generator 216 in conjunction with the multiparty call feature 214 may also receive inputs from the keypad 206 and function buttons 208. The user interface generator 216 may be a software program or computer executable instructions or the like that form a portion of the multiparty call feature 214.

The user interface 202 may also include a microphone 218 and a speaker 220. The microphone 218 receives audio signals from the user and converts the audio signals to electrical signals. The microphone 218 may be connected to the main processor and logic unit 212. The main processor and control logic unit 212 may be connected to a transmitter 222 that converts the baseband signals from the main processor and control logic unit 212 to radio frequency (RF) signals. The transmitter 222 may be connected to an antenna assembly 224 for transmission of the RF signals over the air.

The antenna assembly 224 may receive RF signals over the air and may be connected to a receiver 226 to convert the RF signals to baseband signals. The baseband signals may be applied to the main processor and control logic unit 212. Signals from the main processor and control logic unit 212 may be applied to the speaker 218, and the speaker 218 may convert the electrical signals from the main processor and control logic unit 212 to audio signals that can be understood by the user.

A power source 228, such as a battery or the like, may be connected to the main processor and control logic unit 212 to provide power for operation of the communication device 200. For simplicity, the power source 228 is shown connected to the main processor and control logic unit 212 but may also be connected directly or via a bus (not shown) or the like to other components that may require power for operation. The communication device 200 may also include a subscriber identity module (SIM) 230, smart card or the like and a data storage device 232. The SIM 230 may include subscriber related information including lists of phone numbers, such as call lists, a phonebook (PB) 234, missed call list and the like. The SIM 230 may also include a list of multiparty call groups (MPCGs) 236 that may have been formed or entered via the keypad 206 and function buttons 208 or via voice recognition or the like. A multiparty call group 236 may include contact information, such as a phone number, an email address, voice or text mailbox number, fax number or the like, for each member or communication device in the multiparty call group 236. The multiparty call group 236 may be stored with an identifier (not shown in FIG. 2), such as a name or the like. The user can then easily recall the multiparty call group 236 and establish a conference call or other substantially simultaneous communication, such as voice messaging, text messaging or the like, with all members of the group 236 without having to individually enter or dial the phone number or other contact information and establish communications with each member separately.

The storage device 232 may store lists of phone numbers that have been called by the communication device 200, phone numbers for calls that have been missed or not answered by the communication device 200, or phone numbers entered and stored by the user similar to the phonebook 234 in the SIM 230. The storage device 232 may also store voice messages 238 and text messages 240 that may have been entered by the user. The text messages 240 may be entered via the keypad 206 and function buttons 208 or via voice recognition. The voice messages 238 and text messages 240 may be sent to members of a multiparty call group 236 as part of the multiparty call feature 214, if the user has selected this feature from a menu, similar to menu 125 described with respect to FIG. 1.

The communication device 200 may also include a memory 242 where application programs or the like, such as the multiparty call feature 214 and user interface generator 216 may be stored and accessed by the processor and control logic unit 212.

FIG. 3 is a block diagram of an exemplary communication system 300 in accordance with an embodiment of the present invention. The communication system 300 may be an analog system, digital system or the like. The present invention is not limited to any particular type wireless communication standard, frequency or access technology, such as time division multiple access (TDMA), code division multiple access (CDMA) or the like. The communication system 300 may include at least one mobile switching center (MSC) 302. The communication system 300 may also include a plurality of base stations 304 coupled to the MSC 302 and a plurality of mobile stations 306, mobile terminals or similar communication devices that may communicate with the base stations 304 wirelessly. The mobile stations 306 may each be similar to the communication devices 100 and 200 illustrated in FIGS. 1 and 2 respectively.

Each of the base stations 304 may be coupled to the MSC 302 by a communication link 308. Each communication link 308 may include a plurality of data links or channels (not shown separately in FIG. 3) for transmission of control signals, call supervisory signals and the like between the MSC 302 and each base station 306 and a plurality of voice links or channels (not shown separately in FIG. 3) to carry voice communications or the like. Each base station 304 may provide wireless communications in a predetermined geographical area that is commonly referred to as a cell 310. The cells 310 between adjacent base stations 304 may overlap so as to provide substantially continuous wireless communications as a mobile terminal or station 306 moves from one cell 310 to another.

The MSC 302 may include hardware components and software or computer programs and the like to perform different operations and functions, such a multiparty call feature 312. A storage device 314 may be associated with the MSC 302. The storage device 314 may store data, computer application programs or the like, for operation of the MSC 302 and may also include software for operation of the multiparty call feature 312. The system 300 may also include a message center or a plurality of voice mailboxes 316 associated with the MSC 302 to store recorded voice messages 318 for distribution. The voice mailboxes 316 may be used as part of the multiparty call feature 312 to store recorded voice messages 318 for distribution to members or communication devices in a multiparty call group 320. The multiparty call group 320 may be the same or similar to one of the multiparty call groups 236 of FIG. 2. For example, the recorded voice messages 318 may be transmitted from one of the mobile stations 306 to the MSC 302 and stored in one of the voice mailboxes 316. A multiparty call group 236 (FIG. 2) including all necessary contact information for each member or communication device may also be transmitted to the MSC 302 from a mobile station 306 and stored in the storage device 314 as one of the multiparty call groups 320.

The system 300 may also include a short message service center (SMSC) 322 or the like to provide text messaging services for the mobile stations 306. The SMSC 322 may be coupled to the MSC 302. As previously discussed, a text message 324 may be entered by a user into the mobile station 306 via a keypad and function buttons, similar to the keypad 108 and function buttons 109 of FIG. 1 or keypad 206 and function buttons 208 of FIG. 2. The text message 324 may then be sent by the mobile station 306 to the base station 304 and the base station 304 may forward the text message 324 to the MSC 302 where the text message 324 may be received by the SMSC 322. The SMSC may store the text message 324 prior to distributing the text message to the members of the multiparty call group 320.

The MSC 302 may also be coupled to the Internet 326 or World Wide Web. Text messages, similar to text messages 324, entered into a mobile station 306 by a user via the keypad and function buttons, may alternatively be sent via the internet 326 to members of the multiparty call group 320.

The MSC 302 may also be connected to a public switched telephone network (PSTN) 328. A plurality of subscribers or wireline terminals 330 may be coupled to the PSTN 328. Accordingly, the multiparty call group 320 may include wireline terminals 330, as well as other mobile stations 306 or other types of communication devices.

FIGS. 4A (4A1 and 4A2), 4B, 4C, 4D, 4E and 4F are a flow chart of a method 400 for establishing communication with multiple communication devices in accordance with an embodiment of the present invention. The method 400 is an exemplary embodiment of the multiparty call feature 104 in FIG. 1, multiparty call feature 214 in FIG. 2 and multiparty call feature 312 in FIG. 3. In block 402 on FIG. 4A, a user of a communication device, such as communication devices 100 or 200 of FIGS. 1 and 2 respectively, or mobile stations 306 in FIG. 3, may select a multiparty call feature, such as the multiparty call feature 104 in menu 125 illustrated in FIG. 1. In response to selecting the multiparty call feature in block 402, the user may be asked if he desires to select an existing or stored multiparty call group (MPCG) in decision block 404 for the multiparty call feature. The question may be generated by the multiparty call feature 214 or the user interface generator 216 in FIG. 2 and displayed as a GUI screen on the display 104 (FIG. 1) or 204 (FIG. 2). The word "YES" may be displayed in the GUI 106 above the select button 112 and the word "NO" may be displayed above the second select button 124 in FIG. 1. The user may then respond by operating either of the select buttons 122 or 124. The user may also respond via voice recognition by speaking a yes or a no into the microphone 218 in FIG. 2. If the user responds no in block 404, the method advances to block 406 and the user may be asked to enter contact information or a phone number from a phonebook, similar to phonebook 234 in FIG. 2. Similarly, the question asking the user to enter contact information or a phone number from the phonebook may be generated by the user interface generator 216 as part of the multiparty call feature 214 and may be displayed on the display 204 (FIG. 2). Again, the words "YES" and "NO" may be displayed above the select buttons 122 and 124 in FIG. 1 for the user to respond or the user may respond by voice recognition and speaking a yes or no into the microphone 218 of the communication device 200 (FIG. 2). If the user responds "yes" in block 406, the method 400 advances to block 408 and the user may select contact information from the phonebook 234 contained in the communication device 200. There are a number of ways that contact information, a phone number or the like may be selected from a phonebook stored in a communication device. For example, a user may enter a name or other identifier for the contact information or phone number, or the user may scroll through a list of names or identifiers that have been stored in the phonebook with associated contact information or phone numbers by using scroll buttons or the like similar to scroll buttons 110 and 112 in FIG. 1. Names or identifiers may be highlighted or marked during the scrolling process and the highlighted name or identifier may then be selected by the user operating a button similar to the enter/YES button 114 or select buttons 122 and 124 in FIG. 1.

If no contact information is selected from the phonebook after a predetermined period of time or if the user commands the communication device to perform some function unrelated to the multiparty call feature in block 410 (FIG. 4A2), the method 400 may end. If contact information is selected from the phone book, the contact information may be added to the multiparty call group (MPCG) in block 412 for the current call or operation being carried out, such as just forming a multiparty call group for future calls or communications or the like.

If the user responds no in block 406 (FIG. 4A1), the method 400 may advance to block 414 where the user may be prompted to enter contact information or a phone number from the keypad 108 or 206 (FIGS. 1 and 2 respectively) or via voice recognition or other means. The user may be prompted to enter the contact information, phone number or the like by a message generated by the multiparty call feature 214 or user interface generator 216 and displayed on the display 204 (FIG. 2). The user may also be prompted by a synthesized voice message that may be generated by the multiparty call feature 214 or user interface generator 216 and played through the speaker 220. In block 416 (FIG. 4A1), the user may be asked if the contact information or phone number entered in block 414 should be saved. The user may respond by selecting a "YES" or a "NO" on the display 104 (FIG. 1) or by voice recognition by speaking yes or no into the microphone 218 (FIG. 2). If the user's response in block 416 is no, the method 400 advances to block 412 (FIG. 4A2) and the contact information or phone number entered in block 414 may be added to the MPCG. If the response in block 416 is yes, the user may be prompted in block 418 (FIG. 4A2) to enter a name or other identifier to be associated with the contact information. After entering a name or other identifier, the communication device 100 or 200 may save the contact information and associated identifier to the phonebook 234 or other memory location in block 420. After saving the contact information, the method 400 may advance to block 412 where the contact information and associated identifier may be added to the MPCG.

From block 412, the method 400 may advance to decision block 422 in FIG. 4B. In block 422, the user may be asked if he wants to select the contact information or phone number for the next member of the MPCG from the phonebook 234 (FIG. 2) or the like. Again, the user may respond by selecting a yes or no on the display, via voice recognition or other suitable means. If the user's response is yes in block 422, the user may be prompted to select contact information or a number from the phonebook 234 in block 424. The prompt may be a message on the display generated by the multiparty call feature program 214 or the user interface generator 216 in association with the multiparty call feature program 214 (FIG. 2). The prompt may also an audio message or synthesized voice that may also be generated by the multiparty call feature program 214 or the user interface generator 216. As previously discussed, a phone number or contact information may be selected from a phone book various ways. A name or identifier may be entered or the user may scroll through a list of names or identifiers and select one.

If no contact information or phone number is selected in block 424, the method 400 may be ended by decision block 426. If contact information is selected in block 424, the method may advance from decision block 426 to block 428 and the contact information may be added to the MPCG for the current call or operation.

If the user's response in decision block 422 is no, the method 400 may advance to block 430 and the user may be prompted to enter contact information via the keypad, voice recognition or other means. In block 432, the user may be asked if the contact information should be saved. If the response is no, the method 400 goes to block 428 and the contact information entered in block 430 is added to the MPCG. If the response in block 432 is yes, the user may be prompted to enter a name or other identifier to be associated with the contact information. The user may be prompted by a displayed message or by an audio message, either of which may be generated by the multiparty call feature program 214 or the user interface generator 216. In block 434, the name or identifier for the contact information may be entered and in block 436, the contact information and associated identifier may be saved to the phonebook 234 or to another memory or data storage location or device. After storing the contact information and associated identifier in block 436, the contact information may be added to the MPCG in block 428.

In block 438, the user may be asked if another member is to be added to the MPCG. The question may be generated by the multiparty call feature program 214 (FIG. 2) or the user interface generator 216 and displayed on the display 204 or 104 (FIG. 1). If the user responds yes to block 438, the method 400 may return to block 422 and the method may continue as previously described with respect to blocks 422–436. If the user responds no, the user may be asked to save the MPCG in block 440. If the user responds yes to block 440, the user may be prompted to enter a name or other identifier for the MPCG in block 442. The name or other identifier may be entered via the keypad 108 (FIG. 1) or 206 (FIG. 2), voice recognition or other means. In block 444 the MPCG and associated identifier may be saved or stored. As previously discussed, the MPCG and associated identifier may be saved in a SIM card, such as SIM card 230 in FIG. 2 or may be stored in another storage device, such as storage device 320 associated with the MSC 302 in FIG. 3. After saving the MPCG and associated identifier, the user may be asked whether to initiate or setup a conference call in block 446. If the user responds no to the question in block 446, the user may be asked whether to form another MPCG in block 448. If the response to the question in block 448 is no the method 400 may end. If the response to the question in block 448 is yes, the method 400 may return to block 422 and another MPCG may be formed by going through the process just described with respect to blocks 422–444.

If the user responds yes to the question in block 446 (FIG. 4B), the method 400 may advance to block 450 in FIG. 4C. In block 450, the user may be asked if a voice call is to be established. If the response in block 450 is no, the user may be asked in block 452 if a voice mail message is to be sent. If the user responds yes to the question in block 452, the user may be prompted in block 454 to record a voice mail message. The user may be prompted to record the voice mail message in block 454 by a message displayed on the display 104 (FIG. 1) or display 204 (FIG. 2) or by an audio prompt, such as a synthesized voice message or the like played through the speaker 220 (FIG. 2). In block 456, the voice message may be recorded and stored in a storage device, such as the storage device 232 in the communication device 200 (FIG. 2). Alternatively, the voice message may be sent to a message center or voice mailbox associated with an MSC, such as the message center or voice mailboxes 316 in FIG. 3.

If the user responds that a voice message is not to be sent in block 452, the method 400 may advance to block 458. In block 458, the user may be prompted to enter a text message. The text message may be entered via a keypad, voice recognition or other means. In block 460, the text message may be sent or distributed to the other members of the MPCG. The text message may be sent to the members of the MPCG in various alternative ways. For example, the text message may be sent directly from the communication device to the members of the MPCG. Alternatively, the text message may be sent to a short message service center (SMSC), such as SMSC 322 (FIG. 3) and then distributed to the MPCG. Another way to send the text message may be via the Internet, such as through an Internet connection or gateway 326 (FIG. 3) associated with the MSC 302.

Returning to decision block 450 in FIG. 4C, if the user responds that a voice call or conference call is to be established, the method 400 advances to block 462 and the calls to the different members or communication devices of the MPCG may be dialed or established. The communication device or mobile station, such as mobile station 306, may automatically place the calls serially to each member of the MPCG without any required user activity in block 464 of FIG. 4D. Alternatively, in block 466 of FIG. 4E the communication device or mobile station, may send the MPCG contact information to a MSC, such as MSC 302 in FIG. 3 or the like. In block 468, the MSC may then establish the conference call by connecting all of the members or communication devices of the MPCG simultaneously.

Returning to block 440 in FIG. 4B, if the user's response to saving the MPCG is no, the method 400 may advance to decision block 470. In block 470, the user may be asked whether to initiate the conference call. If the user's response is no the method may end. If the user's response is yes, the method 400 advances to block 450. As previously described with respect to blocks 450–468 in FIGS. 4C, 4D and 4E, a conference call may be established with the members or communication devices of the MPCG or a voice message or text message may be created and transmitted to the members or communication devices of the MPCG.

Returning to decision block 404 in FIG. 4A1, if the user responds yes that an existing or stored MPCG will be used with the multiparty call feature, the method 400 may advance to block 471. In block 471, the user may be prompted to enter a MPCG name or identifier or alternatively, to select a MPCG from a list of stored MPCGs. The multiparty call group feature 214 or user interface generator 216 (FIG. 2) may generate a message and display it on the display 204 that requests the user to enter an identifier for the MPCG or to select the MPCG from the list of stored MPCGs. The MPCG may be stored with an associated identifier that may be used to recall the MPCG. Alternatively, the list of stored MPCGs may be displayed on the display 104 (FIG. 1) or display 204 (FIG. 2) and the user may use the scroll buttons 110 and 112 (FIG. 1) to scroll through the list and highlight or otherwise mark the MPCG that may be selected by the user operating the enter/YES button 114 or one of the select buttons 122 and 124.

In block 472, the user may be asked if additional parties are to be added to the multiparty call. If the user responds yes, the user may be asked if the additional party is another stored MPCG in decision block 474. If the response in block 474 is no, the method 400 may advance to block 422 in FIG. 4B and the additional party or parties may be selected from a phonebook or entered from a keypad or voice recognition as previously described with respect to blocks 422–428. Additional MPCGs may also be formed as previously described with respect to blocks 422–448 and these additional MPCGs may be used as the additional parties in block 472.

If the response to block 474 is yes, the method may advance to block 476. In block 476, the user may be prompted to enter a MPCG identifier or to select a stored MPCG from a list of stored MPCGs similar to that previously described with respect to block 471. In block 478 (FIG. 4A2), the user may be asked if there is an additional MPCG to be added to the conference call or other communication. If the user responds yes, the method 400 returns to block 476 (FIG. 4A1) and the user may be prompted to enter another MPCG identifier or to select another MPCG from a list of stored MPCGs. If the user responds no to decision block 478 (FIG. 4A2), the method 400 may advance to decision block 480. In decision block 480, the user may be asked whether he desires to save the MPCGs combined by the operations in blocks 476 and 478 as a new MPCG. If the user responds yes to the question generated in block 480, the user may be prompted to enter a name or identifier for the new MPCG in block 482. In block 484, the new MPCG and its associated identifier may be stored. The new MPCG may be stored in a SIM card, such as SIM card 230 in communication device 200 (FIG. 2), or in some other memory location, such as storage device 232 or memory 242 (FIG. 2).

After saving the new MPCG and associated identifier in block 484, the user is asked whether to initiate or establish the conference call or other communication with the new MPCG in block 486. If the user responds no to the question in block 486, the method 400 may end. If the user responds yes, the method 400 advances to block 450 in FIG. 4C and a voice call, voice message or text message may be communicated to the new MPCG as previously discussed with respect to blocks 450–460 in FIG. 4C.

Returning to decision block 480 in FIG. 4A2, if the user responds no to the question in block 480 whether to save the new MPCG, the method 400 may advance to block 487. In block 487, the user may be asked if he desires to initiate or establish the conference call or other communication. If the user responds no, the method 400 may end. If the user responds yes, the method 400 advances to decision block 450 in FIG. 4C and a voice call, voice message or text message may be communicated to the new MPCG as previously discussed without saving the new MPCG for future communications.

Figure 4F:
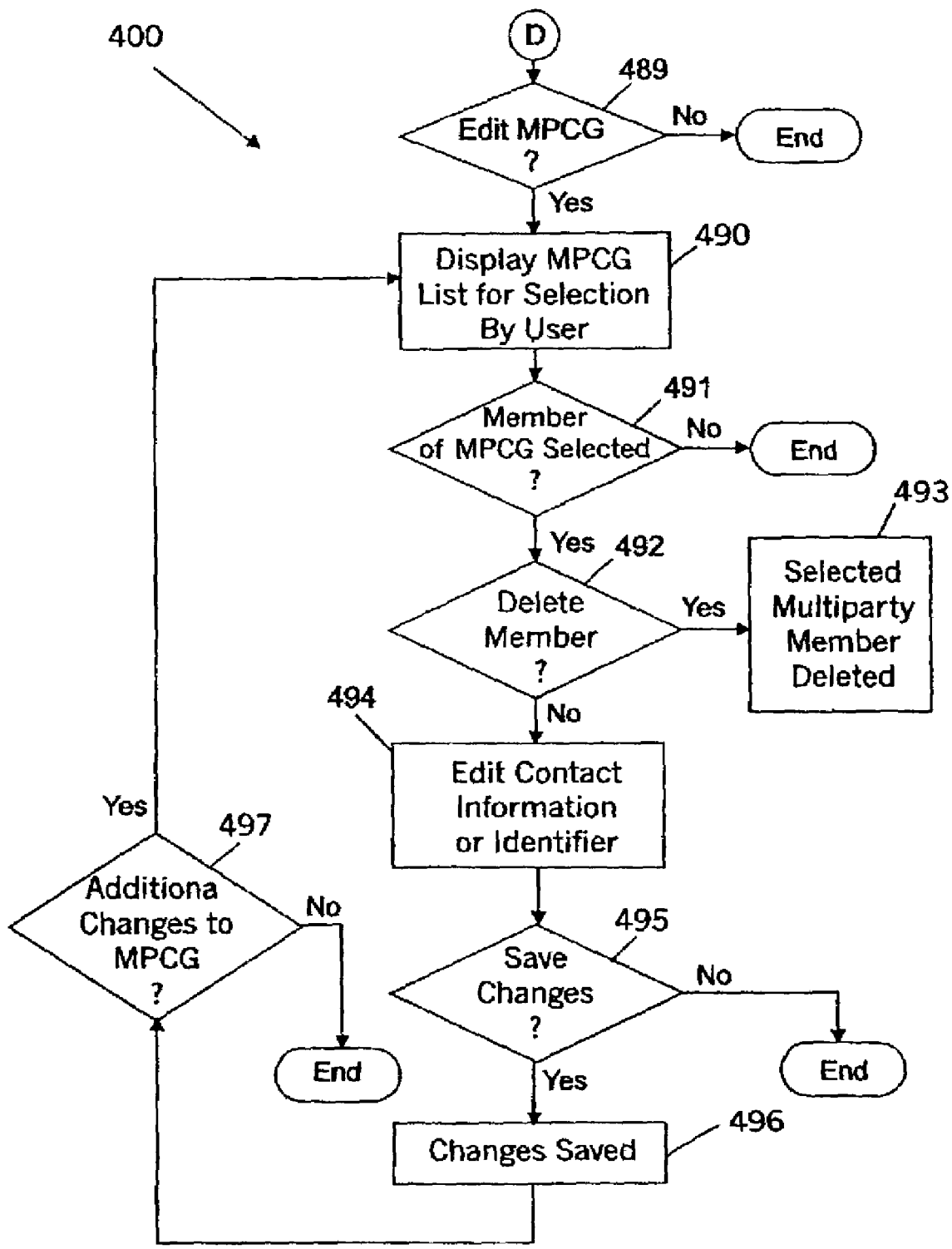

Returning to decision block 472 in FIG. 4A1, if the user responds no to the question of adding additional parties in block 472, the method 400 may advance to decision block 488. In decision block 488, the user may be asked whether to initiate or establish the conference call or other communication with the MPCG selected in block 471. If the user responds yes to the question in block 488, the method 400 may advance to block 450 in FIG. 4C and a voice call, recorded voice message or text message may be sent to the members or communication devices of the MPCG. If the user responds no to the question of initiating the call in block 488, the method 400 may advance to block 489 in FIG. 4F. In block 489, the user may be asked whether to edit the MPCG selected in block 471 of FIG. 4A. If the user responds no, the method 400 may end. If the user responds yes, the method 400 may advance to block 490. In block 490, the MPCG selected in block 471 may be displayed listing the contact information of the different members for selection by the user. The members of the MPCG may be displayed in a display, such as display 104 in FIG. 1 and the user may operate the scroll buttons 110 and 112 to move between the different MPCG members and highlight or mark a member for selection. The user may then select a member by operating the enter/YES button 114 or one of select buttons 122 or 124 or the like. In block 491, if the user does not select a member of the MPCG, the method 400 may end. If the user selects a member of the MPCG, the user may be asked if the member is to be deleted in decision block 492. If the user responds yes, the selected member of the MPCG is deleted in block 493. If the user responds no to the question in block 492, the user, in block 494, may be prompted to edit the contact information and the identifier that may be stored in association with the member. In block 495, the user may be asked whether to save the changes to the selected member. If the user responds no, the method 400 may end without saving the changes and the selected member information remains as before. If the user responds yes, the changes may be saved in block 496. In block 497, the user may be asked if additional changes or edits to the MPCG are desired. If the user responds no in block 497, the method 400 may end. If the user responds yes, the method 400 may return to block 490 where the revised list of the members of the MPCG may be displayed for selection of another member by the user and the user may proceed through blocks 490–497 to edit the MPCG as previously described.

In summary, an example of the multiparty call feature 214 in FIG. 2 or 312 in FIG. 3 may be embodied in the method 400 in FIGS. 4A–4F. Accordingly, any questions or prompts described with respect to the method 400 above may be generated by the multiparty call feature 214 or 312 or by the user interface generator 216 in association with the multiparty call feature 214 or 312. The prompts and questions may be displayed on the display 204 (FIG. 2) or 104 (FIG. 1). Alternatively, some or all prompts or questions may be audio, such as a synthesized voice or the like, played through the speaker 220 (FIG. 2).

The method 400 may be embodied in a computer readable medium or electronic readable medium, such as memory 242 or storage device 232 in FIG. 2, storage device 314 in FIG. 3 or the like, having computer-executable instructions for performing the method 400. The computer readable medium may include any type of memory or data storage device, such as flash memory, floppy disk, compact disc-read only memory (CD-ROM), nonvolatile ROM, random access memory (RAM) or the like.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method for establishing communications with multiple communication devices, comprising:
   selecting a multiparty call group from a storage device or forming a multiparty call group, wherein the multiparty call group includes contact information for each communication device in the multiparty call group;
   asking a user if a voice call is to be established;
   establishing the voice call with each communication device of the multiparty call group in response to the user indicating that the voice call is to be established;
   asking the user if a voice mail message is to be sent in response to the user indicating that the voice call is not to be established;
   prompting the user to record the voice mail message in response to the user indicating that the voice mail message is to be sent to each communication device of the multiparty call group; and
   prompting the user to enter a text message in response to the user indicating that the voice mail message is not to be sent.

2. The method of claim 1, wherein establishing the voice call with each communication device comprises establishing a conference call.

3. The method of claim 2, wherein establishing the conference call comprises serially dialing a phone number for each communication device of the multiparty call group in response to a user selecting a multiparty call feature.

4. The method of claim 2, wherein establishing the conference call comprises transmitting the contact information for each communication device of the multiparty call group to a mobile switching center, wherein the mobile switching center establishes the conference call with each communication device.

5. The method of claim 1, further comprising transmitting the voice mail message in response to the user recording the message.

6. The method of claim 5, wherein transmitting the voice message comprises:
storing the voice message in a mobile station; and
transmitting the voice message to each communication device of the multiparty call group from the mobile station.

7. The method of claim 5, wherein transmitting the voice message comprises: storing the voice message in a storage device associated with a mobile switching center; and
distributing the voice message from the mobile switching center to each communication device of the multiparty call group.

8. The method of claim 1, further comprising:
transmitting the text message to each communication device in the multiparty call group in response to the user entering the text message.

9. The method of claim 8, wherein transmitting the text message comprises sending the text message to a short message center for distribution to each communication device in the multiparty call group.

10. The method of claim 8, wherein transmitting the text message comprises sending the text message via an Internet connection.

11. The method of claim 8, wherein transmitting the text message comprises:
storing the text message in a mobile station; and
transmitting the text message from the mobile station to each communication device in the multiparty call group.

12. The method of claim 1, wherein selecting a multiparty call group comprises one of entering a multiparty call group identifier or scrolling through a list of multiparty call groups.

13. The method of claim 1, wherein forming a multiparty call group comprises selecting contact information stored in a communication device.

14. The method of claim 1, wherein forming a multiparty call group comprises entering contact information from a keypad or by voice recognition into a communication device.

15. The method of claim 1, wherein forming a multiparty call group comprises:
entering contact information for at least one multiparty call group member from a keypad or by voice recognition into a communication device; and
selecting contact information for at least one multiparty call group member from contact information stored in the communication device.

16. The method of claim 1, wherein forming the multiparty call group comprises:
entering contact information for each communication device in the multiparty call group;
entering an identifier associated with the multiparty call group; and
storing the multiparty call group and the associated identifier.

17. The method of claim 16, further comprising storing the multiparty call group and associated identifier in a mobile station.

18. The method of claim 16, further comprising storing the multiparty call group and associated identifier in a storage device associated with a mobile switching center.

19. The method of claim 16, further comprising storing the multiparty call group and associated identifier in a subscriber identity module (SIM).

20. The method of claim 1, further comprising providing a capability for editing the multiparty call group.

21. The method of claim 20, wherein providing the capability for editing the multiparty call group comprises:
displaying contact information and an associated identifier for each communication device of the multiparty call group for selection by a user; and
deleting or editing the contact information and associated identifier selected by the user.

22. The method of claim 1, further comprising adding contact information corresponding to at least one communication device outside of the multiparty call group for communication with the at least one communication device outside of the multiparty call group and the multiparty call group.

23. A method for establishing communications with multiple communication devices, comprising:
providing a multiparty call feature for selection by a user;
presenting an option for the user to select any stored multiparty call group or to form a multiparty call group in response to the user selecting the multiparty call feature;
providing the user options to communicate with multiple communications devices in the multiparty call group by selecting one of establishing a voice call with each communications device, transmitting a voice mail message to each communications device, and transmitting a text message to each communications device.

24. The method of claim 23, further comprising forming the multiparty call group by at least one of selecting any stored contact information or entering contact information into a communication device.

25. The method of claim 23, wherein presenting the option to the user to select any stored multiparty call group comprises prompting the user to enter an identifier associated with any stored multiparty call group.

26. The method of claim 23, wherein presenting the option to the user to select any stored multiparty call group comprises presenting a list of any stored multiparty call groups for selection by the user.

27. The method of claim 23, further comprising establishing a conference call between a mobile station and each communication device having contact information in the multiparty call group in response to the user indicating that the voice call is to be established.

28. The method of claim 27, wherein establishing a conference call comprises serially dialing a phone number for each communication device in the multiparty call group by the mobile station.

29. The method of claim 27, wherein establishing a conference call comprises transmitting contact information for each communication device of the multiparty call group to a mobile switching center from the mobile station, wherein the mobile switching center establishes the conference call between the mobile station and each communication device in the multiparty call group.

30. The method of claim 23, further comprising transmitting the voice message to each communication device in the multiparty call group in response to the user recording the voice message.

31. The method of claim 30, wherein transmitting the voice message comprises:
storing the voice message in a storage device associated with the mobile station; and
transmitting the voice message to each communication device in the multiparty call group.

32. The method of claim 30, wherein transmitting the voice message comprises:
storing the voice message in a storage device associated with a mobile switching center; and
distributing the voice message from the mobile switching center to each communication device in the multiparty call group.

33. The method of claim 23, further comprising transmitting the text message to each communication device in the multiparty call group in response to the user entering the text message.

34. The method of claim 33, wherein transmitting the text message comprises sending the message to a short message center.

35. The method of claim 33, wherein transmitting the text message comprises:
storing the text message in the mobile station; and
transmitting the text message from the mobile station to each communication device in the multiparty call group.

36. The method of claim 23, further comprising forming the multiparty call group by at least one of selecting any stored contact information or entering contact information into a communication device, wherein entering the contact information includes at least one of entering the contact information by a keypad or by voice recognition.

37. The method of claim 36, further comprising:
permitting the user to enter an identifier associated with the multiparty call group; and
permitting the user to store the multiparty call group and the associated identifier.

38. The method of claim 37, wherein the multiparty call group is stored in the mobile station.

39. The method of claim 37, wherein the multiparty call group is stored in a storage device associated with a mobile switching center.

40. The method of claim 23, further comprising permitting the user to simultaneously communicate with each communication device in the multiparty call group and with at least one communication device not in the multiparty call group.

41. A device for establishing communications with multiple communication devices, comprising:
a multiparty call feature;
a display to present the multiparty call feature to a user for selection;
a storage device to store any multiparty call groups for selection by the user;
a transmitter to communicate with members of a multiparty call group;
means for asking a user if a voice call is to be established;
means for establishing the voice call with each communication device of the multiparty call group in response to the user indicating that the voice call is to be established;
means for asking a user if a voice mail message is to be sent in response to the user indicating that the voice call is not to be established;
means for prompting the user to record the voice mail message in response to the user indicating that the voice mail message is to be sent to each communication device of the multiparty call group; and
means for prompting the user to enter a text message in response to the user indicating that the voice mail message is not to be sent.

42. The device of claim 41, further comprising at least one multiparty call group, wherein the multiparty call group is formed by at least one of selecting stored contact information or by entering contact information into the device.

43. The device of claim 42, further comprising a set of function buttons to form the at least one multiparty call group.

44. The device of claim 42, further comprising a keypad to enter contact information and identifiers to form the at least one multiparty call group.

45. The device of claim 41, wherein the storage device comprises a subscriber identity module to store the multiparty call groups.

46. The device of claim 41, wherein the multiparty call feature presents an option to the user to select a stored multiparty call group in response to the user selecting the multiparty call feature.

47. The device of claim 46, wherein the multiparty call feature prompts the user to enter an identifier associated with any stored multiparty call group in response to the user selecting the option.

48. The device of claim 46, wherein the multiparty call feature presents a list of any stored multiparty call groups for selection by the user in response to the user selecting the option.

49. The device of claim 43, wherein the multiparty call feature permits the user to communicate with the multiparty call group by at least one of establishing a conference call, transmitting a voice message or transmitting a text message.

50. The device of claim 49, wherein the device comprises a processor adapted to cause serial dialing of a phone number associated with each member of the multiparty call group to establish the conference call.

51. The device of claim 49, wherein the transmitter transmits contact information associated with each member of the multiparty call group to a mobile switching center, wherein the mobile switching center establishes the conference call.

52. A system for establishing communications with multiple communication devices, comprising:
at least one base station to communicate with at least one communication device;
a mobile switching center to communicate with the at least one base station;
a multiparty call feature to permit a user of the at least one conmmnication device to communicate with multiple other communication devices in a multiparty call group by selecting the multiparty call feature; and
means to selectively perform at least one of establish a voice call with each communication device in the multiparty call group, transmit a voice mail message to each communication device in the multiparty call group, and transmit a text message to each communication device in the multiparty call group.

53. The system of claim 52, further comprising at least one multiparty call group, wherein the multiparty call group is formed by at least one of selecting contact information from a storage device or entering contact information into the at least one communication device by the user.

54. The system of claim 52, wherein the multiparty call feature presents an option to the user to select any stored multiparty call group or to form a multiparty call group in response to the user selecting the multiparty call feature.

55. The system of claim 54, wherein the multiparty call feature prompts the user to enter an identifier associated with any stored multiparty call group in response to the user selecting the option.

56. The system of claim 54, wherein the multiparty call feature presents a list of any stored multiparty call groups for selection by the user in response to the user selecting the option.

57. The system of claim 54, wherein the multiparty call feature permits the user to communicate with each communication device in the multiparty call group by establishing a conference call, transmitting the voice message or transmitting the text message.

58. The system of claim 57, wherein the at least one communication device comprises a processor adapted to cause serial dialing of a phone number associated with each communication device in the multiparty call group to establish the conference call.

59. The system of claim 57, wherein the at least one communication device comprises a transmitter to transmit contact information for each communication device in the multiparty call group to the mobile switching center, wherein the mobile switching center establishes communication with each communication device in the multiparty call group.

60. The system of claim 57, wherein the at least one communication device comprises:
a storage device to store the voice message; and
a transmitter to transmit the voice message to each communication device in the multiparty call group.

61. The system of claim 57, wherein the mobile switching center comprises a storage device to store the voice message and the mobile switching center transmits the voice message to each communication device in the multiparty call group.

62. The system of claim 57, wherein the at least one communication device comprises:
a keypad to enter the text message; and
a transmitter to communicate the text message.

63. The system of claim 57, further comprising a short message center to store the text message.

64. A computer-readable medium having computer-executable instructions for performing a method, comprising:
providing a multiparty call feature for selection by a user;
presenting an option for the user to select any stored multiparty call group or to form a multiparty call group in response to the user selecting the multiparty call feature; and
asking a user if a voice call is to be established;
establishing the voice call with each communication device of the multiparty call group in response to the user indicating that the voice call is to be established;
asking a user if a voice mail message is to be sent in response to the user indicating that the voice call is not to be established;
prompting the user to record the voice mail message in response to the user indicating that the voice mail message is to be sent to each communication device of the multiparty call group; and
prompting the user to enter a text message in response to the user indicating that the voice mail message is not to be sent.

65. The computer-readable medium having computer-executable instructions for performing the method of claim 64, wherein presenting the option to the user to select any stored multiparty call group comprises prompting the user to enter an identifier associated with any stored multiparty call group.

66. The computer-readable medium having computer-executable instructions for performing the method of claim 64, wherein presenting the option to the user to select any stored multiparty call group comprises presenting a list of any stored multiparty call groups for selection by the user.

67. The computer-readable medium having computer-executable instructions for performing the method of claim 64, further comprising permitting the user to communicate with communication devices having contact information in the multiparty call group by establishing a conference call, transmitting a voice message or transmitting a text message.

68. The computer-readable medium having computer-executable instructions for performing the method of claim 67, wherein establishing a conference call comprises serially dialing a phone number for each communication device in the multiparty call group by a mobile station.

69. The computer-readable medium having computer-executable instructions for performing the method of claim 67, wherein establishing a conference call comprises transmitting contact information for each communication device in the multiparty call group to a mobile switching center from a mobile station, wherein the mobile switching center establishes the conference call between the mobile station and each communication device in the multiparty call group.

* * * * *